(12) United States Patent
Mordukhovich

(10) Patent No.: US 12,454,996 B1
(45) Date of Patent: Oct. 28, 2025

(54) HIGH SPEED ELECTRIC DRIVE MODULE

(71) Applicant: FCA US LLC, Auburn Hills, MI (US)

(72) Inventor: Gregory Mordukhovich, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/917,206

(22) Filed: Oct. 16, 2024

(51) Int. Cl.
| | |
|---|---|
| *B60K 1/00* | (2006.01) |
| *B60K 17/04* | (2006.01) |
| *B60K 17/16* | (2006.01) |
| *F16H 37/08* | (2006.01) |
| *F16H 57/021* | (2012.01) |
| *F16H 57/031* | (2012.01) |
| *F16H 57/02* | (2012.01) |

(52) U.S. Cl.
CPC .......... *F16H 37/0813* (2013.01); *B60K 1/00* (2013.01); *B60K 17/043* (2013.01); *B60K 17/165* (2013.01); *F16H 57/021* (2013.01); *F16H 57/031* (2013.01); *B60K 2001/001* (2013.01); *F16H 2057/02034* (2013.01); *F16H 2057/02052* (2013.01)

(58) Field of Classification Search
CPC .. F16H 37/0813; F16H 57/021; F16H 57/031; F16H 2057/02034; F16H 2057/02052; B60K 1/00; B60K 17/043; B60K 17/165; B60K 2001/001
See application file for complete search history.

(56) References Cited

U.S. PATENT DOCUMENTS

| | | | |
|---|---|---|---|
| 2015/0038277 A1* | 2/2015 | Tamura | B60L 15/2054 475/150 |
| 2018/0299000 A1* | 10/2018 | Littlefield | B60K 17/165 |
| 2021/0062903 A1* | 3/2021 | Isono | F16H 48/24 |
| 2021/0404535 A1* | 12/2021 | Behringer | B60K 17/165 |
| 2023/0272844 A1* | 8/2023 | Zhong | B60K 1/00 74/335 |

FOREIGN PATENT DOCUMENTS

| | | | | |
|---|---|---|---|---|
| CN | 206528340 U | * | 9/2017 | B60K 17/08 |
| DE | 102015110839 A1 | * | 1/2017 | B60K 17/08 |
| WO | WO-2024055593 A1 | * | 3/2024 | B60K 1/00 |

OTHER PUBLICATIONS

Understanding Gear Reduction in Electric Motors, Jun. 1, 2015, pp. 1-4, Groschopp Blog. (Year: 2025).*

* cited by examiner

*Primary Examiner* — Tisha D Lewis
(74) *Attorney, Agent, or Firm* — Jeremy J. Klobucar

(57) ABSTRACT

An electrified powertrain that generates and transfers drive torque to a driveline of an electrified vehicle is provided. The electrified powertrain includes an electric drive module having an electric motor, a transfer shaft, a final drive pinion gear and a final drive ring gear. The electric motor has a rotor shaft that includes first and second pinion gears fixed for rotation thereon. The transfer shaft includes first and second transfer gears meshed for rotation with the first and second pinion gears, the first and second transfer gears providing a first gear ratio reduction from the first and second pinion gears. The final drive pinion gear is fixed for rotation on the transfer shaft. The final drive ring gear is meshed for rotation with the final drive pinion gear and provides a second gear ratio reduction from the final drive pinion gear to the final drive ring gear.

14 Claims, 4 Drawing Sheets

HIGH SPEED ELECTRIC DRIVE MODULE

FIELD

The present application generally relates to electrified vehicles and, more particularly, to a high speed electric drive module having an electric motor, and a differential.

BACKGROUND

An electrified vehicle (hybrid electric, plug-in hybrid electric, range-extended electric, battery electric, etc.) includes at least one battery system and at least one electronic drive module having at least one electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. It can be challenging to provide a high-speed offset electric drive module that provides maximum power density, efficiency and reduced cost while satisfying noise vibration harshness (NVH), reliability and durability requirements. Accordingly, while such electronic drive modules do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module having an electric motor, a transfer shaft, a final drive pinion gear and a final drive ring gear. The electric motor has a rotor shaft that includes first and second pinion gears fixed for rotation thereon. The transfer shaft includes first and second transfer gears meshed for rotation with the first and second pinion gears, the first and second transfer gears providing a first gear ratio reduction from the first and second pinion gears. The final drive pinion gear is fixed for rotation on the transfer shaft. The final drive ring gear is meshed for rotation with the final drive pinion gear and provides a second gear ratio reduction from the final drive pinion gear to the final drive ring gear, the final drive ring gear driving a differential that in turn drives first and second output shafts. The first and second output shafts drive respective drive wheels of the electrified vehicle.

In some implementations, the final drive pinion gear is located on the transfer shaft between the first and second transfer gears.

In some implementations, the electrified powertrain further comprises first and second pinion bearings that support the rotor shaft adjacent to the respective first and second pinion gears.

In some implementations, the electrified powertrain further comprises first and second transfer bearings that support the transfer shaft adjacent to the respective first and second transfer gears.

In some implementations, the electrified powertrain further comprises first and second final drive bearings that support the respective first and second output shafts.

In additional aspects, the first and second transfer bearings support the transfer shaft inboard of the respective first and second transfer gears.

In additional features, the first and second transfer bearings support the transfer shaft outboard of the respective first and second transfer gears.

In examples, the first and second transfer bearings are supported by a cover assembly that houses the electric drive module.

In additional features, the first and second pinion bearings are supported by a motor housing of the electric motor.

In other features, first and second pinion bearings support the rotor shaft inboard of the respective first and second pinion gears.

In additional aspects, the first gear ratio reduction is 1:4.5.

In other features, the second gear reduction ratio is 1:4.5.

In additional implementations, an overall gear reduction of the electric drive module is between 16 and 17.

In additional embodiments, an electrified powertrain that generates and transfers drive torque to a driveline of an electrified vehicle is provided. The electrified powertrain includes an electric drive module comprising: an electric motor having a rotor shaft that drives a differential disposed inside the electric motor; first and second pinion gears fixed for rotation with first and second output shafts driven by the differential; first and second transfer gears fixed for rotation to respective first and second transfer shafts and meshed for rotation with the first and second pinion gears, the first and second transfer gears providing a first gear ratio reduction from the first and second pinion gears; a first and second final drive pinion gear fixed for rotation on the respective first and second transfer shafts; a first and second final drive gear meshed for rotation with the respective first and second final drive pinion gears and providing a second gear ratio reduction from the final drive pinion gears to the final drive gears, the final drive ring gears driving first and second output drive shafts.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, it can be challenging to provide a high-speed offset electric drive module (EDM) that provides maximum power density, efficiency and reduced cost while satisfying noise vibration harshness (NVH), reliability and durability requirements. In particular, a high speed EDM requires multiple stages with extended envelope to convert an input speed to a desired wheel speed. In some prior art configurations, three or more reduction stages are provided increasing mass and cost. In other prior art configurations, a layshaft architecture presents manufacturing errors from a multi-mesh contact related to unequal load sharing between the layshafts. Such layshaft configurations, also provide increased mass and cost.

The instant disclosure provides a compact EDM that provides a torque split at the electric motor. Maximum electric motor torque can be applied to each torque branch. Multiple gear meshing is avoided.

Figure 1:
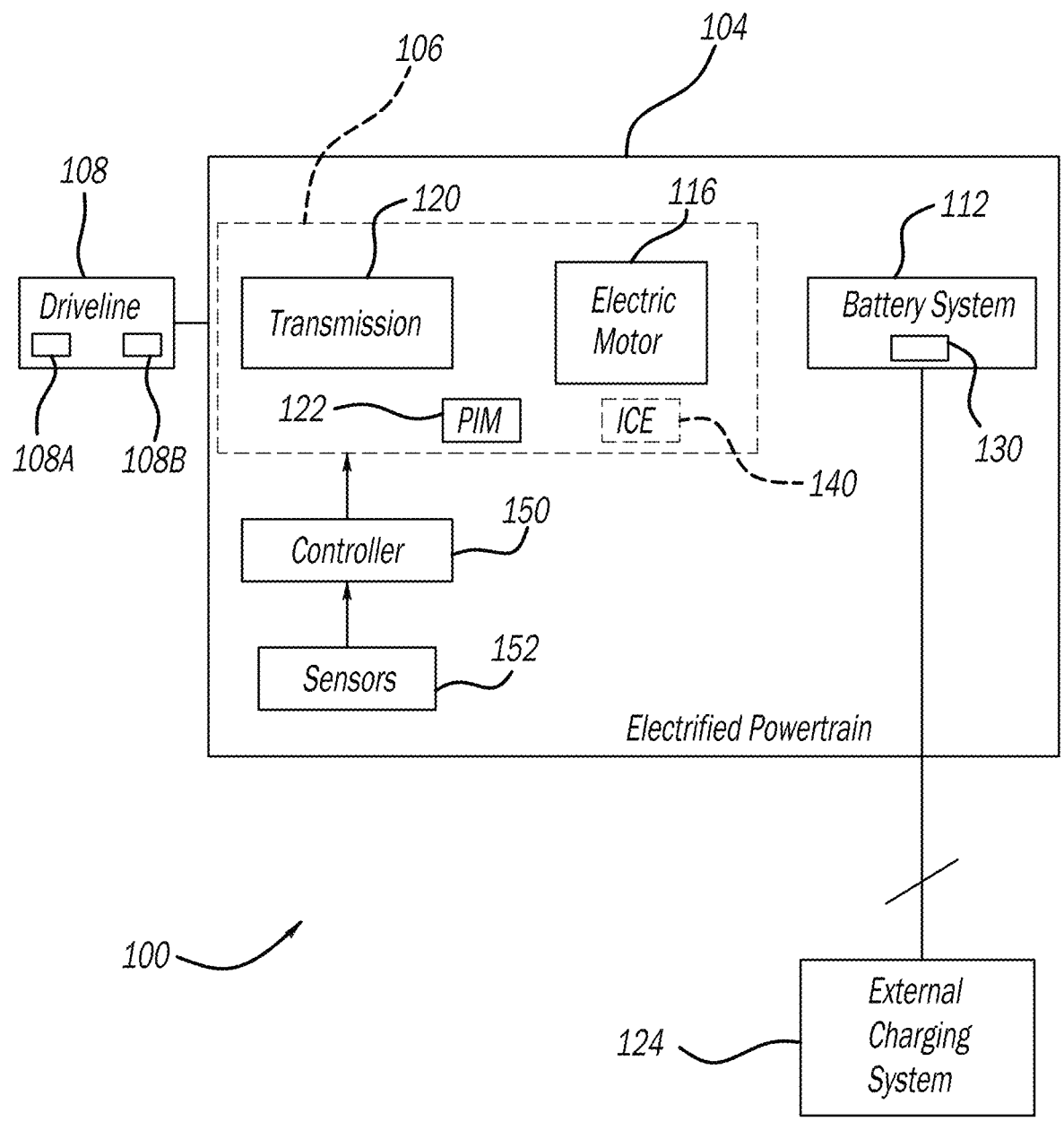
FIG. 1 is a functional block diagram of an electrified vehicle having an electronic drive module (EDM) according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 having drive wheels 108A, 108B for vehicle propulsion. The EDM 106 generally includes an electric motor identified at 116 (e.g., electric traction motor), an electric drive gearbox assembly or transmission, collectively identified at 120, and power electronics including a power inverter module (PIM) 122.

The electric motor 116 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140. A controller 150 can provide various inputs to the EDM 106, based on signals received from sensors 152 to operate the EDM in various modes based on operating conditions as described herein.

With additional reference now to FIG. 2, an EDM 106A constructed in accordance to a first example of the present disclosure will be described. The EDM 106A includes a first electric motor 116A including a stator 154A and a rotor 156A supported in a motor housing 158A, and a differential 160. The rotor 156A rotates a rotor shaft 170 that drives a first pinion gear 172A and a second pinion gear 172B. The rotor shaft 170 is rotatably supported by a first pinion bearing 174A and a second pinion bearing 174B. The first and second pinion bearings 174A and 174B are supported by a first housing portion 176A and a second housing portion 176B.

The input pinion gears 172A and 172B are rotatably meshed to respective transfer gears 210A and 210B that drive a transfer shaft 212. The transfer shaft 212 is rotatably supported by a first transfer bearing 220A and a second transfer bearing 220BB. The first and second transfer bearings 220A and 220B are supported by a third housing portion 224A and a fourth housing portion 224B. A final drive pinion gear 230 is fixed to and driven by the transfer shaft 212. In examples, the final drive pinion gear 230 is located intermediate the transfer gears 210A and 210B. The final drive pinion gear 230 is meshed for rotation and drives a final drive ring gear 234 that in turn provides a rotatable input to the differential 160.

The differential 160 can include planet gears 242A, 242B rotatably coupled to the final drive ring gear 234. The planet gears 242A, 242B are meshed for rotation with output gears 244A, 244B. In the example shown the planet gear 242A drives a first output shaft 260A while the planet gear 244B drives a second output shaft 260B. The first output shaft 260A is rotatably supported by a first final drive bearing 270A positioned on a fifth housing portion 274A. The second output shaft 260B is rotatably supported by a second final drive bearing 270B positioned on a sixth housing portion 274B. The first and second output shafts 260A, 260B ultimately provide input rotation to drive wheels 108A, 108B.

Figure 2:
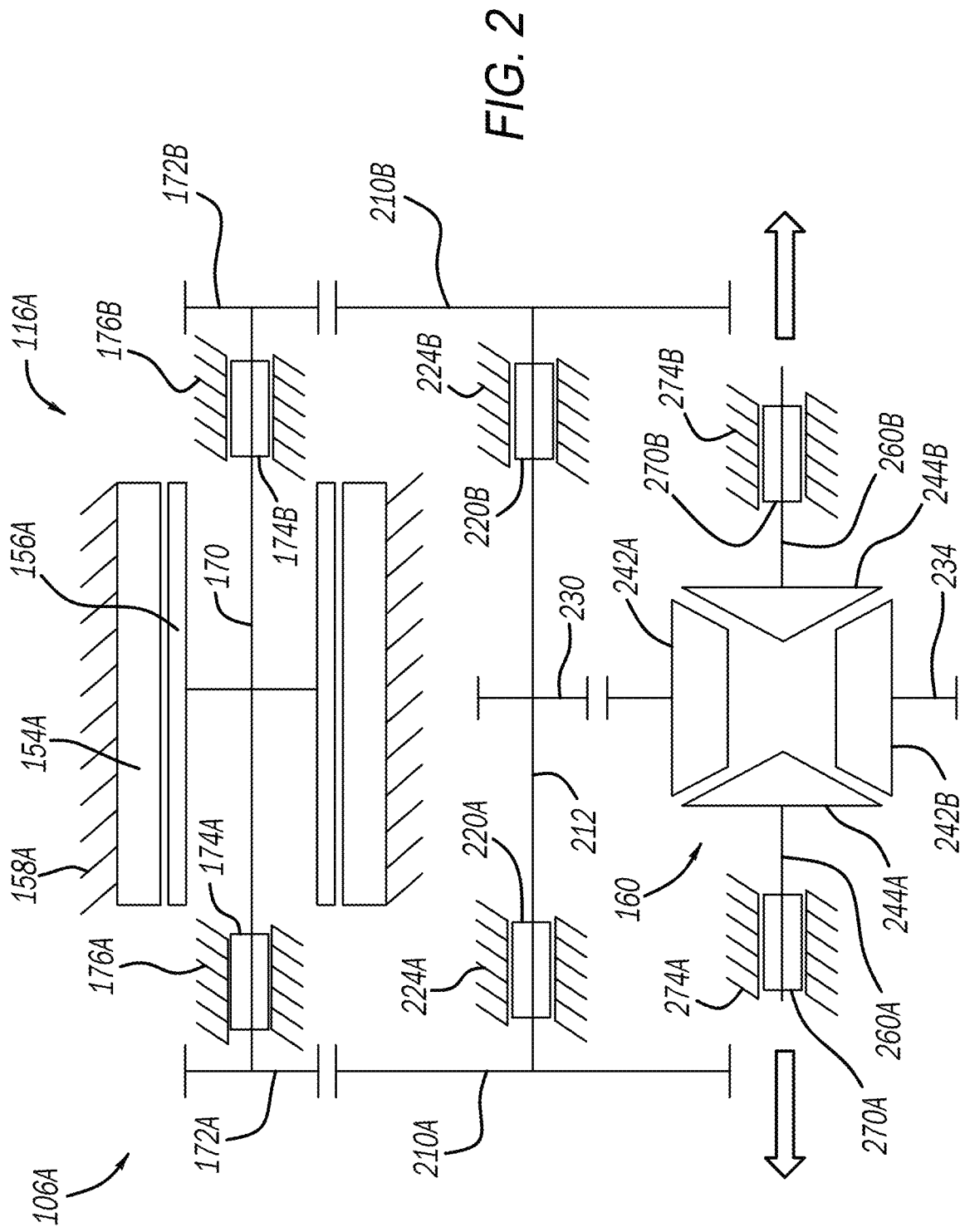
FIG. 2 is schematic illustration of an EDM having a differential configured at a final drive ring gear with a torque split at the electric motor and combined at the final drive pinion, and having transfer gears overhang support from the motor housing according to a first example of the present application.

In the EDM 106A of FIG. 2, the final drive pinion 230 is smaller than the bearings 220A and 220B. As such, the third and fourth bearings 220A and 220B can be positioned inboard of the transfer gears 210A and 210B. Furthermore, some or all of the first, second, third, fourth, fifth and sixth housing portions 176A, 176B, 224A, 224B, 274A, 274B, are part of the motor housing 158A. The EDM 106A provides a high reduction ratio gear solution, such as, but not limited to about 1:4.5 from the pinion gears 172A, 172B to the transfer gears 210A, 210B; and about 1:4.5 from the final drive pinion 230 to the final drive pinion gear 234. In some examples, the EDM 106A can provide 16 to 17 gear reduction ratio overall (from the motor 116A to the wheels (output shafts 260A, 260B)). Other ratios are contemplated.

With additional reference now to FIG. 3, an EDM 106B constructed in accordance to a second example of the present disclosure will be described. The EDM 106B includes a first electric motor 116B including a stator 154B and a rotor 156B supported in a motor housing 158A, and a differential 360. The rotor 156B rotates a rotor shaft 370 that drives a first pinion gear 372A and a second pinion gear 372B. The rotor shaft 370 is rotatably supported by a first pinion bearing 374A and a second pinion bearing 374B. The first and second pinion bearings 374A and 374B are supported by a first housing portion 376A and a second housing portion 376B.

The input pinion gears 372A and 372B are rotatably meshed to respective transfer gears 410A and 410B that drive a transfer shaft 412. The transfer shaft 412 is rotatably supported by a first transfer bearing 420A and a second transfer bearing 420BB. The first and second transfer bearings 420A and 420B are supported by a third housing portion 424A and a fourth housing portion 424B. A final drive pinion gear 430 is fixed to and driven by the transfer shaft 412. In examples, the final drive pinion gear 430 is located intermediate the transfer gears 410A and 410B. The final drive pinion gear 430 is meshed for rotation and drives a final drive ring gear 434 that in turn provides a rotatable input to the differential 360.

The differential 360 can include planet gears 442A, 442B rotatably coupled to the final drive ring gear 434. The planet gears 442A, 442B are meshed for rotation with output gears 444A, 444B. In the example shown, the planet gear 442A drives a first output shaft 460A while the planet gear 444B drives a second output shaft 460B. The first output shaft 460A is rotatably supported by a first final drive bearing 470A positioned on a fifth housing portion 474A. The second output shaft 460B is rotatably supported by a second final drive bearing 470B positioned on a sixth housing portion 474B. The first and second output shafts 460A, 460B ultimately provide input rotation to drive wheels 108A, 108B.

Figure 3:
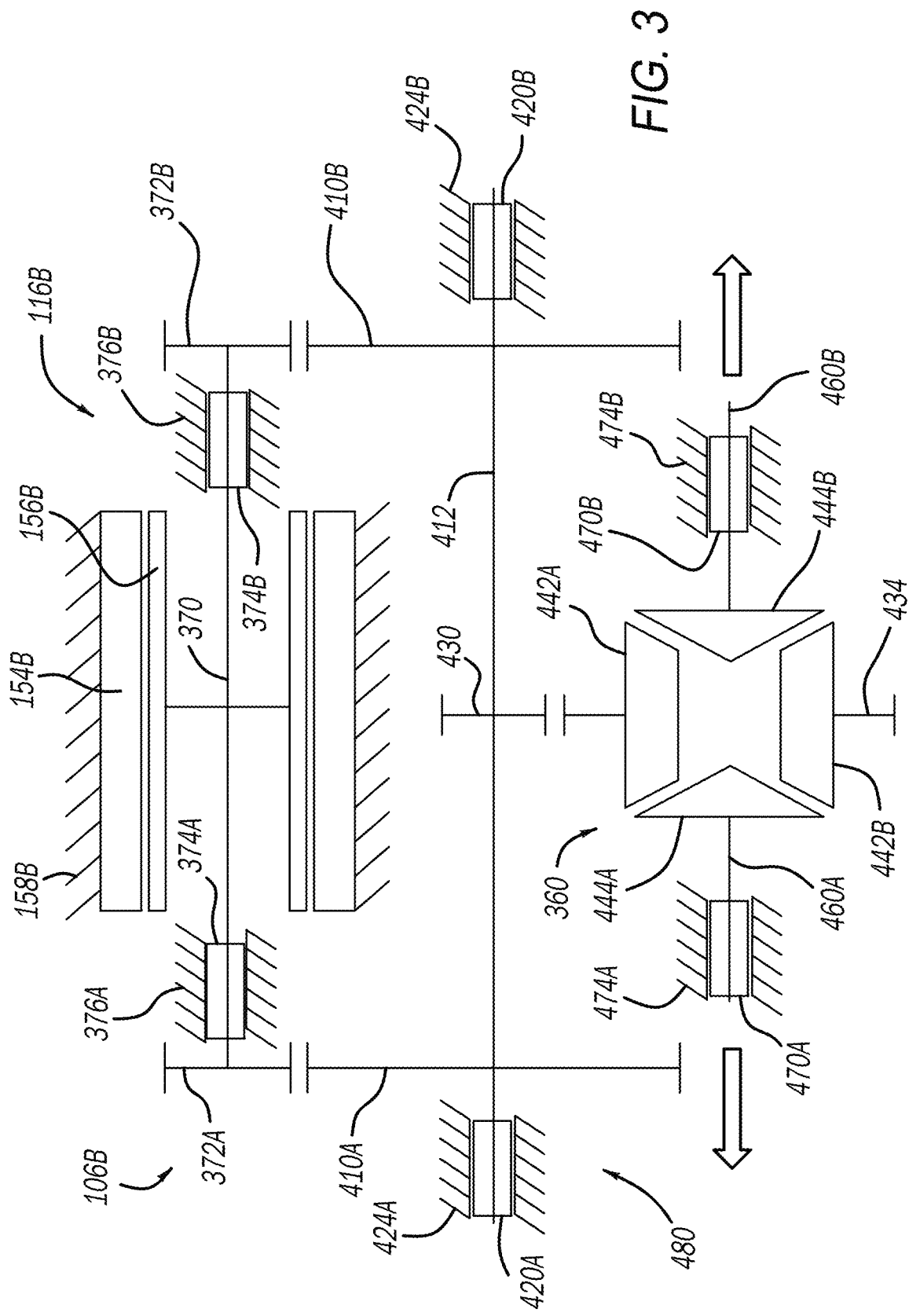
FIG. 3 is schematic illustration of an EDM having a differential configured at a final drive ring gear with a torque split at the electric motor and combined at the final drive pinion, and having transfer gears overhang support from the assembly cover according to a second example of the present application.

In the EDM 106B of FIG. 3, the final drive pinion 430 is larger than the third and fourth bearings 420A and 420B. As such, the third and fourth bearings 420A and 420B can be positioned outboard of the transfer gears 410A and 410B. In examples, some or all of the first, second, fifth and sixth housing portions 376A, 376B, 474A, 474B are part of the motor housing 158B. The third and fourth housing portions 424A and 424B are part of a cover assembly 480 that houses the EDM 106B. The EDM 106B provides a high reduction ratio gear solution, similar to described above with respect to the EDM 106B, however slightly different as the pinion gear 430 is larger than the pinion gear 230. It is appreciated that a desired gear reduction can be achieved in any embodiment disclosed herein based on selection of the respective gears.

Figure 4:
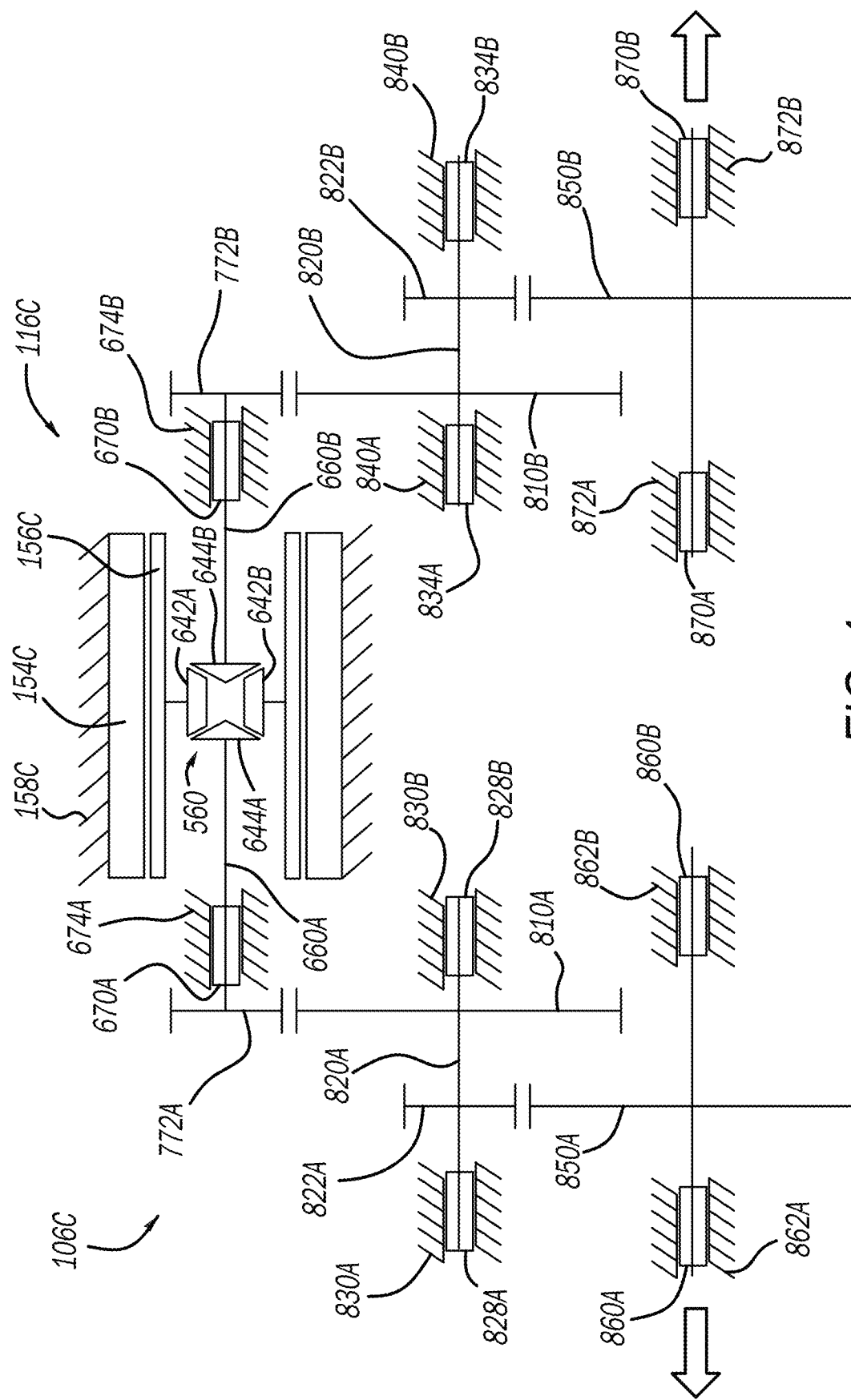
FIG. 4 is schematic illustration of an EDM having a differential configured inside the electric motor according to a third example of the present application.

Turning now to FIG. 4, an EDM 106C constructed in accordance to a third example of the present disclosure will be described. The EDM 106C includes a first electric motor 116C including a stator 154C and a rotor 156C supported in a motor housing 158C, and a differential 560. The differential 560 can include planet gears 642A, 642B rotatably driven by the rotor 156C. The planet gears 642A, 642B are meshed for rotation with output gears 644A, 644B. In the example shown, the planet gear 642A drives a first output shaft 660A while the planet gear 644B drives a second output shaft 660B. The first output shaft 660A is rotatably supported by a first bearing 670A positioned on a first housing portion 674A. The second output shaft 660B is rotatably supported by a second bearing 670B positioned on a second housing portion 674B.

The first output shaft 660A is fixed to and rotates an input pinion 772A and a second pinion 772B. The input pinion 772A rotates a first transfer gear 810A. The input pinion 772B rotates a second transfer gear 810B. The first transfer gear 810A is fixed to and rotates a first transfer shaft 820A. The second transfer gear 810B is fixed to and rotates a second transfer shaft 820B. A first final drive pinion gear 822A is fixed for rotation with the first transfer shaft 820A. A second final drive pinion gear 822B is fixed for rotation with the second transfer shaft 820B. The first transfer shaft 820A is supported by first transfer shaft bearings 828A, 828B disposed in a third and fourth housing portion 830A, 830B. The second transfer shaft 820B is supported by second transfer shaft bearings 834A, 834B disposed in a fifth and sixth housing portion 840A, 840B.

The first final drive pinion gear 822A is meshed for rotation with a first final drive gear 850A that rotates a first final drive shaft 852A supported by first final drive shaft bearings 860A, 860B disposed in seventh and eighth housing portions 862A and 862B. The second final drive pinion gear 822B is meshed for rotation with a second final drive gear 850B that rotates a second final drive shaft 852B supported by second final drive shaft bearings 870A, 870B disposed in ninth and tenth housing portions 872A and 872B. The first and second final drive shafts 852A, 852B ultimately provide input rotation to drive wheels 108A, 108B.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
   an electric drive module comprising:
      an electric motor having a rotor shaft that extends on opposite ends of the electric motor and includes first and second pinion gears fixed on opposite ends of the rotor shaft for rotation thereon, the electric motor providing a torque split on opposite ends thereof;
      a transfer shaft that includes first and second transfer gears meshed for rotation with the first and second pinion gears, the first and second transfer gears providing a first gear ratio reduction from the first and second pinion gears;
      a final drive pinion gear fixed for rotation on the transfer shaft; and
      a final drive ring gear meshed for rotation with the final drive pinion gear and providing a second gear ratio reduction from the final drive pinion gear to the final drive ring gear, the final drive ring gear driving a differential that in turn drives first and second output shafts.

2. The electrified powertrain of claim 1, wherein the final drive pinion gear is located on the transfer shaft between the first and second transfer gears.

3. The electrified powertrain of claim 1, further comprising:
   first and second pinion bearings that support the rotor shaft adjacent to the respective first and second pinion gears.

4. The electrified powertrain of claim 3, further comprising:
   first and second transfer bearings that support the transfer shaft adjacent to the respective first and second transfer gears.

5. The electrified powertrain of claim 4, further comprising:
   first and second final drive bearings that support the respective first and second output shafts.

6. The electrified powertrain of claim 4, wherein the first and second transfer bearings support the transfer shaft inboard of the respective first and second transfer gears.

7. The electrified powertrain of claim 4, wherein the first and second transfer bearings support the transfer shaft outboard of the respective first and second transfer gears.

8. The electrified powertrain of claim 7, wherein the first and second transfer bearings are supported by a cover assembly that houses the electric drive module.

9. The electrified powertrain of claim 6, wherein the first and second pinion bearings are supported by a motor housing of the electric motor.

10. The electrified powertrain of claim 6, wherein first and second pinion bearings support the rotor shaft inboard of the respective first and second pinion gears.

11. The electrified powertrain of claim 1, wherein the first gear ratio reduction is 1:4.5.

12. The electrified powertrain of claim 1, wherein the second gear reduction ratio is 1:4.5.

13. The electrified powertrain of claim 1, wherein an overall gear reduction of the electric drive module is between 16 and 17.

14. An electrified powertrain that generates and transfers drive torque to a driveline of an electrified vehicle, the electrified powertrain comprising:
   an electric drive module comprising:
      an electric motor having a rotor shaft that extends on opposite ends of the electric motor and includes first and second pinion gears fixed on opposite ends of the rotor shaft for rotation thereon, the electric motor providing a torque split on opposite ends thereof;
      a transfer shaft that includes first and second transfer gears meshed for rotation with the first and second pinion gears, the first and second transfer gears providing a first gear ratio reduction from the first and second pinion gears;
      first and second transfer bearings disposed inboard of the respective first and second transfer gears and that support the transfer shaft;
      a final drive pinion gear fixed for rotation on the transfer shaft and located on the transfer shaft between the first and second transfer gears;
      first and second pinion bearings disposed inboard of the respective first and second pinion gears and that support the rotor shaft;
      a final drive ring gear meshed for rotation with the final drive pinion gear and providing a second gear ratio reduction from the final drive pinion gear to the final drive ring gear, the final drive ring gear driving a differential that in turn drives first and second output shafts; and
      first and second final drive bearings disposed inboard of the first and second pinion gears and the first and second transfer gears, the first and second final drive bearings supporting the respective first and second output shafts;
      wherein the electric motor, the final drive pinion gear and the differential all rotate within a boundary of the first and second transfer gears and the first and second pinion gears on parallel offset axes.

* * * * *